No. 843,500. PATENTED FEB. 5, 1907.
W. SOBEY.
PLANTER.
APPLICATION FILED JUNE 22, 1904.

Witnesses:
Fred Gulast
[signature]

Inventor:
William Sobey
By Peirce & Fisher
Attys

No. 843,500. PATENTED FEB. 5, 1907.
W. SOBEY.
PLANTER.
APPLICATION FILED JUNE 22, 1904.

No. 843,500. PATENTED FEB. 5, 1907.
W. SOBEY.
PLANTER.
APPLICATION FILED JUNE 22, 1904.

Witnesses:

Inventor:
William Sobey
By Peirce & Fisher
Attys.

UNITED STATES PATENT OFFICE.

WILLIAM SOBEY, OF RACINE, WISCONSIN, ASSIGNOR TO J. I. CASE PLOW WORKS, OF RACINE, WISCONSIN, A CORPORATION.

PLANTER.

No. 843,500.          Specification of Letters Patent.          Patented Feb. 5, 1907.

Application filed June 22, 1904. Serial No. 213,608.

*To all whom it may concern:*

Be it known that I, WILLIAM SOBEY, a citizen of the United States, and a resident of Racine, county of Racine, and State of Wisconsin, have invented certain new and useful Improvements in Planters, of which the following is declared to be a full, clear, and exact description.

The invention relates to planters of the type known as "combined planters and listers," which are used with certain soils to plant seed in a trench, the trench or furrow being formed by a plow or other suitable furrow-opener carried on the machine in front of the seed mechanism. Such planters are subjected to severe usage; and one of the objects of the invention is to provide a simple strong frame of few parts and so arranged that the parts subject to strain may be formed of wrought iron or steel bars, thereby avoiding the use of cast metal.

Further objects of the invention are to provide simple and effective means by which the furrow opening and covering devices arranged, respectively, in front and in rear of the seed mechanism may be shifted to and from working position by a common shifter and actuating-handle, which is also preferably arranged to throw the seed mechanism into and out of gear.

The invention also seeks to provide independent adjustable connections between the controlling-shifter and the furrow-opening device or plow, so arranged that the adjustment of the latter does not disturb the relative operation of the other parts, and, further, to provide means by which the covering devices may be automatically locked in working position, together with means actuated by the controlling-shifter for releasing said lock, and to improve the construction of the standard or the plow or furrow-opener and guiding devices therefor, whereby the thrust upon the plow-standard may be taken up by tension-bars of wrought iron or steel.

Other objects of the invention are to improve and simplify the construction and arrangement of parts, as will hereinafter appear; and the invention consists in the features of construction, combinations, and arrangement of parts set forth in the following description, illustrated in the accompanying drawings, and more particularly pointed out in the appended claims.

In the drawings, Fig. 2ª is an inverted plan view of the guide-pocket for the standard of the plow or other furrow-opening device. Fig. 3ª is a detail view of the shift mechanism for the drag-bars which carry the covering devices. Fig. 5ª is a detail elevation of the locking mechanism for holding the covering devices in working position. Figs. 5ᵇ and 5ᶜ are detail side views of the locking mechanism shown, respectively, in and out of operative position.

Figure 1:
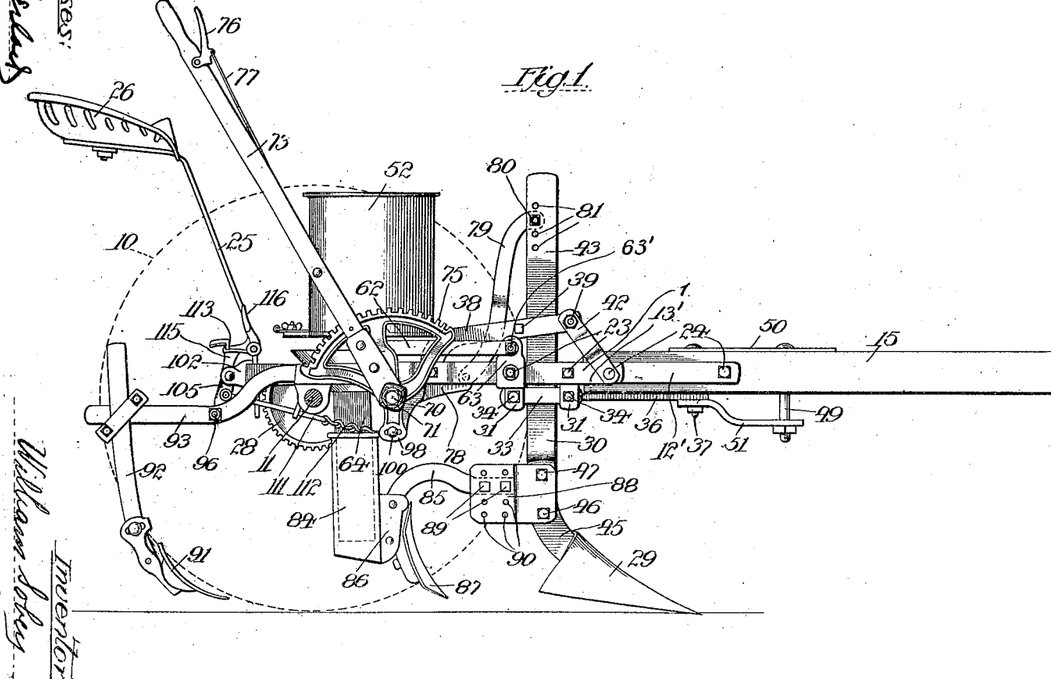
Figure 1 is a side elevation of the improved planter in which for the sake of clearness the wheel-shaft is shown in section and the supporting-wheels indicated by a dotted line.
Figures 3, 3A:
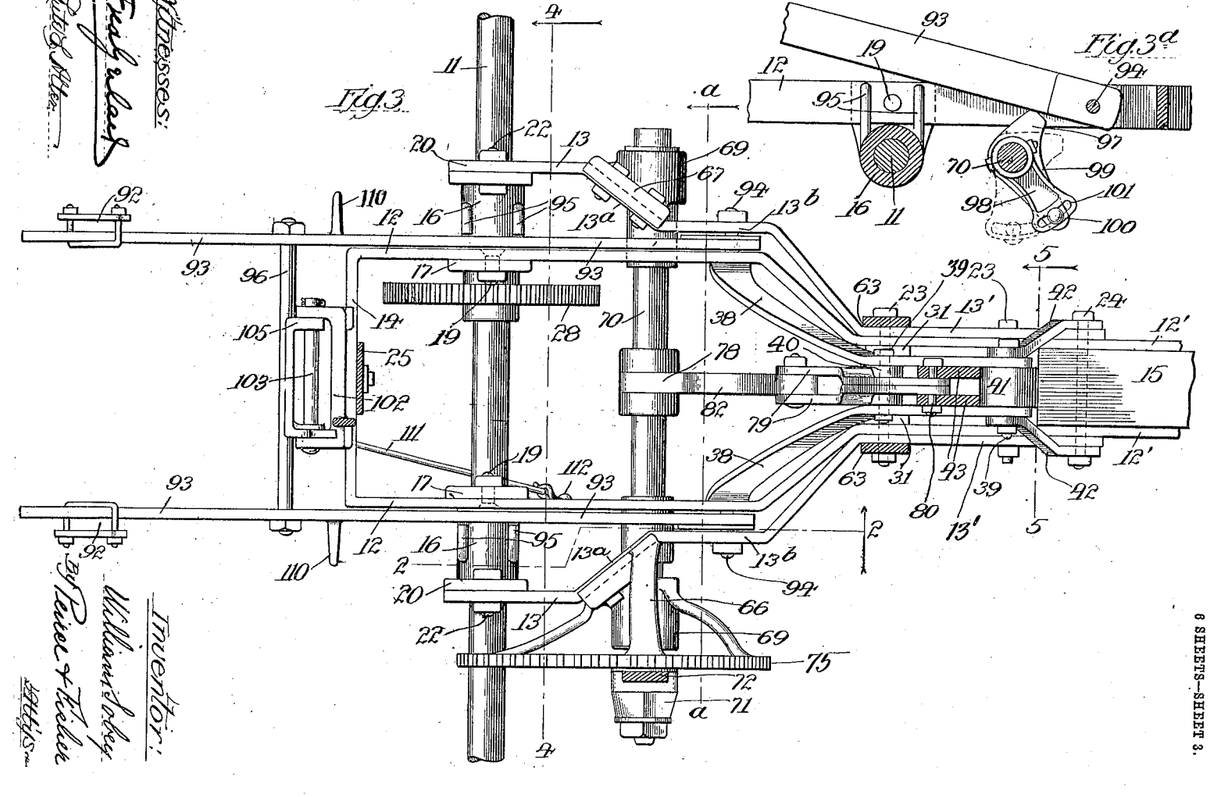
Fig. 3 is a plan view of the machine-frame, certain parts being broken away and certain parts shown in section.

The supporting-wheels 10 for the planting-machine are rigidly secured to the drive-axle 11, so that the latter rotates with the wheels. The frame of the machine comprises the inner side-bars 12 and the outer side bars 13. These bars are formed of wrought iron or steel and arranged on edge, as shown, to give strength to the frame of the machine. The inner side bars 12 are preferably constructed of a single piece bent to form a loop, as shown, so that the rear end of the loop forms a cross-bar 14 between the rear ends of the side bars 12. From cross-bar 14 the side bars 12 extend forwardly in parallel relation and at their forward ends converge and terminate in forwardly-extending parallel portions 12', which overlap the sides of the draft pole or tongue 15. Bearing-boxes 16 from the wheel or drive-axle 11 are provided at their inner ends with upstanding lugs 17, having seats or shouldered portions 18 engaging the inner side bars 12. Bolts 19 securely connect lugs 17 and the inner side bars 12. The rear ends of the outer side bars 13 are spaced apart or separated from the inner side bars 12, and upstanding lugs 20 on the outer end of bearing-boxes 16 are provided with shoulders or seats 21, engaging the rear ends of the outer side bars, which are secured to the lugs by bolts 22. At their forward ends the outer side bars converge and terminate in forwardly-extending parallel portions 13', which overlap the forward ends 12' of the inner side bars. The forward overlapping portions of the inner and outer side bars are secured together by bolts 23 and to the tongue by bolts 24. This frame construction of inner side bars, outer side or brace bars extending from the inner and outer ends, respectively, of the bearing-boxes 16 to the tongue, comprises few parts, which are, however, rigidly secured and braced together and will stand the severe use to which machines of this type are subjected. To the rear cross-bar 14 of the frame is secured a rearwardly upwardly inclined seat-post 25, preferably of spring metal and carrying the operator's seat 26. The drive-axle or wheel-shaft 11 is held against longitudinal shift by a pin 27, (see Fig. 4,) extending through the axle and engaging one end of one of the bearing-boxes 16, and by a spur-gear 28, which is rigidly secured to the shaft and the hub of which engages the other face of the bearing-box.

At the forward part of the machine and in front of the seed mechanism is arranged a suitable furrow-opening device, which is preferably a double moldboard or middle-burster plow 29 and which forms the trench or furrow within which the seed is planted. The plow 29 or other suitable furrow-opening device is secured to the lower end of a vertically-disposed standard 30, which extends upwardly between the adjacent front ends 12' of the side bars of the frame and between the cross-bolts 23. From each of the cross-bolts 23 depend a pair of lugs 31, formed of short pieces of wrought iron or steel bars. These lugs and the front ends 12' of the side bars are securely held in place and are held apart by spacing-thimbles 32, mounted upon the bolts 23. (See Fig. 2.) Lugs 31 are connected together at their lower ends by side straps 33 and cross-bolts 34, extending through the lugs and straps, so that a pocket is formed through which the vertically-disposed standard 30 extends. Upon the rear bolt 34 is mounted a guide-roller 35, which engages the rear edge of the standard. The rear end of a bar 36 is bent around the front bolt 34 between the side straps 33, and bar 36 extends forwardly along the under side of the tongue 15 and is secured thereto by a bolt 37. A pair of brace-bars 38 are securely bolted to the inner side bars 12 of the frame, extend upwardly therefrom, converging forwardly, as shown, and terminate in parallel adjacent portions embracing the standard 30. Bolts 39 extend between the ends of the brace-bars 38 on opposite sides of the plow-standard. A spacing-thimble 40 about the rear bolt 39 holds the brace-bars 38 apart, and a guide-roller 41 upon the front bolt 39 engages the front edge of the standard. A second pair of brace-bars 42 are connected to the front bolt 39 outside of the brace-bars 38, are bent forwardly and outwardly, as shown, and secured to the rear cross-bolt 24.

It will be observed that the guide-rollers 35 and 41 for the standard are arranged out of line and that the thrust upon the standard when the plow is in the ground is rearwardly upon the guide-roller 35 and forwardly upon the guide-roller 41. The thrust upon the rear guide-roller 35 is taken up by the forwardly-extending tension-straps 33 and tension-bar 36, and the thrust upon the front guide-roller 41 is taken up by the rearwardly-extending tension brace-bars 38. By this arrangement the parts which take the thrust on the standard can be in the form of tension-bars of wrought iron or steel, and parts of cast metal which are liable to break are not employed. The guides and braces for holding the plow to its work are securely held in place and at the same time the plow or other furrow-opening device and standard therefor may be readily shifted in vertical direction to and from working position.

Figures 5, 5A, 5B, 5C:
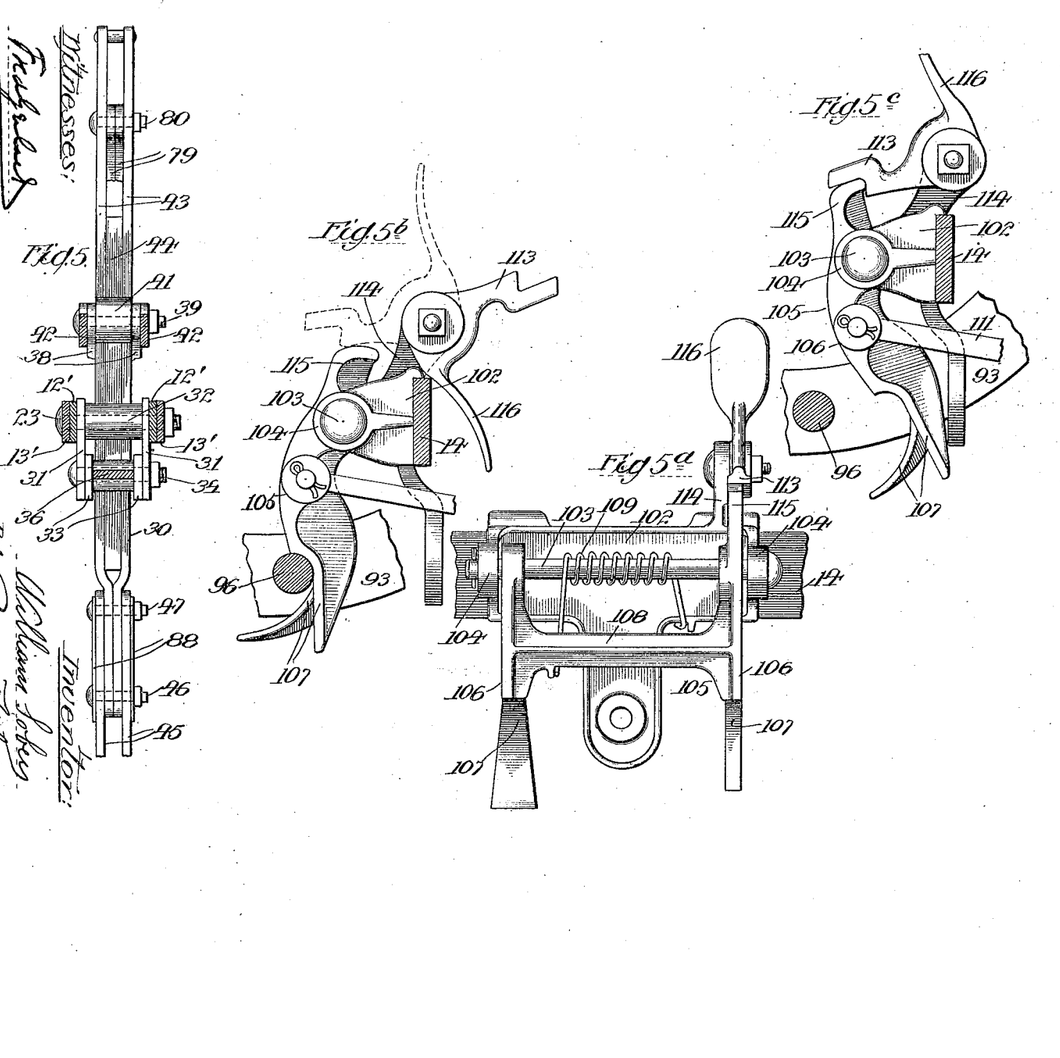
Fig. 5 is a detail view of the standard and guides therefor, certain parts being shown in section on line 5 5 of Fig. 3.

The standard 30 is preferably formed, as shown in Fig. 5, of two bars 43, connected together and separated throughout the greater portion of their length by an intermediate filler-bar 44. The lower ends of the side bars 43 of the standard below the filler-bar 44 are bent inwardly and brought together, so that the lower end of the standard is reduced in thickness, as shown. A foot formed of separate side pieces 45 carries the plow 29 and is adjustably secured to the lower reduced end of the standard which extends, as shown in Fig. 5, between the side pieces 45 of the foot. Side pieces 45 are pivoted to the standard by a bolt 46 and may be swung or adjusted about this pivot-bolt, being held in adjusted position by a bolt 47, extending through the lower contracted end of the standard and through one of a series of holes 48 (see Fig. 2) in the side pieces 45. It will be observed that the outer faces of the standard and of the foot-pieces 45 are in the same vertical plane, so that the standard and foot may be raised within the guide-pocket on the frame to any desired extent. By adjusting the foot upon the lower end of the standard the plow 29 may be set at any desired inclination relatively to the ground.

The lower end of a bolt 49, extending vertically through the draft-tongue 15, serves as a hitch for the drag-bar of the team. A plate 50 is arranged between the heads of the bolts 37 and 49, and a bent strap 51 connects the lower ends of these bolts. By means of the connected straps 51 and 36 the draft of the team is brought to bear directly upon the standard 30.

The seed box or hopper 52 is provided with a suitable bottom 53, of cast metal, and within the seedbox-bottom is mounted a horizontal beveled gear 54, which drives a seed-plate 55 of any suitable or desired construction. Interchangeable seed mechanism for planting seeds of different kinds may be arranged in the well-known manner within the seedbox-bottom.

The seedbox-bottom 53 (see Fig. 6) is secured at diametrically opposite points and at either side of the machine upon a pair of brackets 56. The brackets 56 are provided with depending lugs 57, arranged to engage and rest upon the inner side bars 12 of the planter-frame, and the brackets are also provided with depending ears 58, within which a counter-shaft 59 is journaled. A combined beveled and spur pinion 60, the separate portions of which are cast integrally with each other or otherwise formed in one piece, is keyed to the counter-shaft 59. The beveled portion of the combined pinion engages the teeth of the beveled gear 54, while the spur portion of the combined pinion engages the teeth of the spur-gear 28 upon the axle 11.

Figure 6:
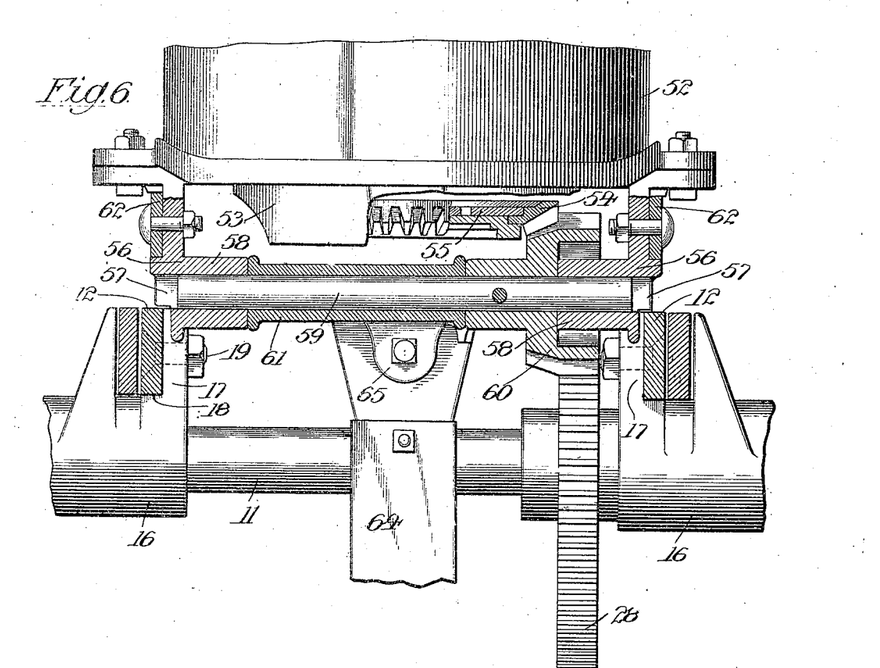
Fig. 6 is a detail front view of the seed mechanism and operating-gearing therefor, and Fig. 6ª is a detail side view illustrating the manner of mounting the seed-can.
Figure 6A:
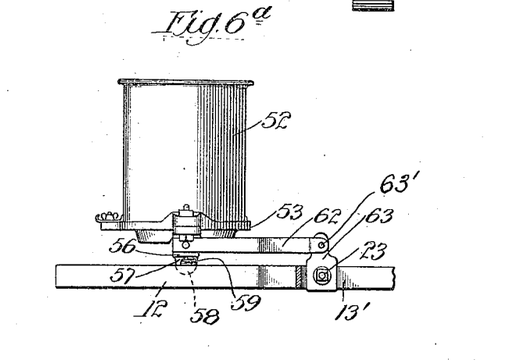

The counter-shaft 59 is held against longitudinal shift with the ears 58 by the engagement of the combined pinion with one of the ears and by a sleeve 61, arranged on the shaft and extending between the pinion 60 and the ear 58 upon the opposite bracket.

To connect and disconnect the drive-gearing between axle 11 and the seed mechanism within the box or hopper 52, said box or hopper and parts connected therewith are vertically shiftable to throw the pinion 60 into and out of mesh with the spur-gear 28. For this purpose the rear ends of a pair of links 62 are arranged within seats in the outer faces of brackets 56 and are securely connected thereto. The forward ends of the links 62 converge or are bent toward each other and are pivotally connected to upstanding lugs 63 on the frame by bolts 63'. These lugs are conveniently secured in place upon the outer ends of the rear bolt 23, which extends, as described, between the forward ends 12' and 13' of the inner and outer side bars. The seedbox and seed mechanism, together with the counter-shaft 59, pinion 60, and links 62, swing vertically upon the pivot-bolts 63' to throw the pinion 60 into and out of mesh with the drive-gear 28, and thus start or stop the seeding mechanism, as desired.

A seed-delivery chute 64, through which the seed from the seed mechanism within the box or hopper passes to the ground, is bolted at its inner end to a lug 65 upon the sleeve 61. This sleeve is free to oscillate upon the counter-shaft 59, so that, in effect, the delivery-chute 64 is pivotally supported upon the shaft and swings thereon as it is raised and lowered with the seed mechanism. In this manner the delivery-chute shifts up and down in a substantially vertical direction and does not interfere with the proper shift of the seed mechanism as the latter is swung about pivots 63' and thrown into and out of gear.

Figures 3, 4:
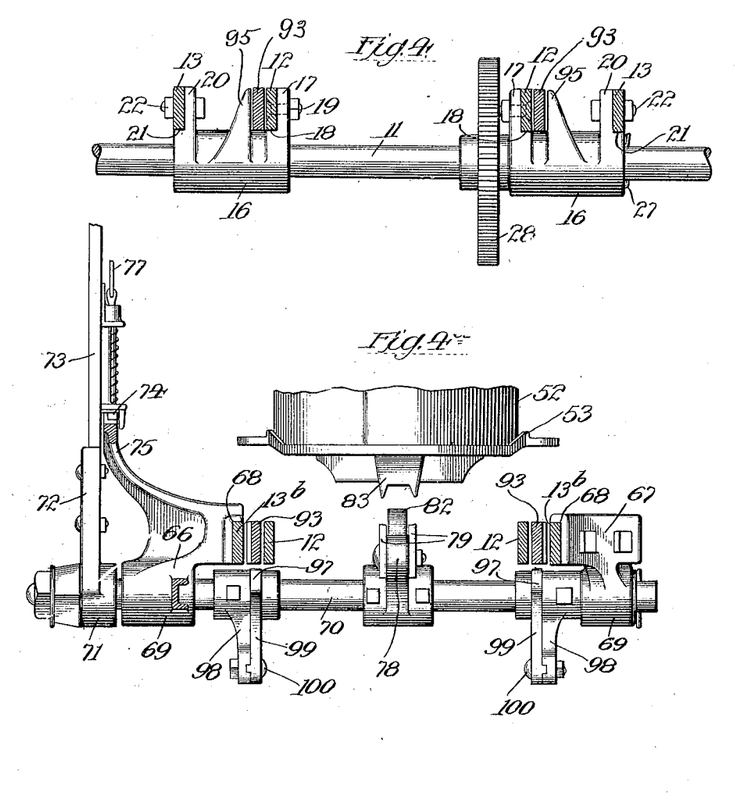
Figs. 4 and 4ª are detail cross-sectional views on lines 4 4 and *a a*, respectively, of Fig. 3.

In front of the wheel-axle 11 the outer side or brace bars 13 are provided, as shown, with forwardly-inclined portions 13$^a$, extending toward the inner side bars 12, and with straight portions 13$^b$, arranged adjacent and parallel with the inner side bars. Brackets 66 and 67 are provided with seats or shouldered portions 68, (see Fig. 4$^a$,) fitting and bolted to the inclined portions 13$^a$ of the outer side bars. (See Fig. 3.) These brackets 66 and 67 are provided with depending lugs 69, within which is journaled the shifter rock-shaft 70. A hub 71, secured to the outer end of shaft 70, carries an upstanding lug or arm 72, to which is bolted an actuating hand-lever 73. A spring-pressed dog 74 upon the hand-lever 73 is arranged to engage the teeth of a segment 75, cast in one piece or otherwise connected to the bracket 66, so as to hold the controlling shift mechanism in any desired position. A trip 76, pivoted to the handle 73 at its upper end, is connected to the dog 74 by a link 77, so that the dog may be disengaged by the operator.

An arm 78, fixed centrally upon the shifter rock-shaft 70, projects forwardly therefrom. Its outer end extends between the lower ends of a pair of links 79 and is pivotally connected thereto. The upper ends of the links 79 are contracted together (see Figs. 3 and 5) and extend between the upper ends of the side bars 43, which form the plow-standard 30. A bolt 80 pivotally connects the links 79 and the side bars 43 of the plow-standard, and this pivot-bolt may be arranged to engage any one of a series of holes 81 in the plow-standard to adjustably connect the latter with the shift mechanism. A cam 82, formed on the upper edge of the arm 78, (see Figs. 2 and 4$^a$,) is arranged to engage a depending lug 83, formed on the seedbox-bottom 53, to lift the seed mechanism and disconnect the drive-gear therefor by throwing pinion 60 out of mesh with the gear 28 in the manner previously described.

Figures 2, 2A:
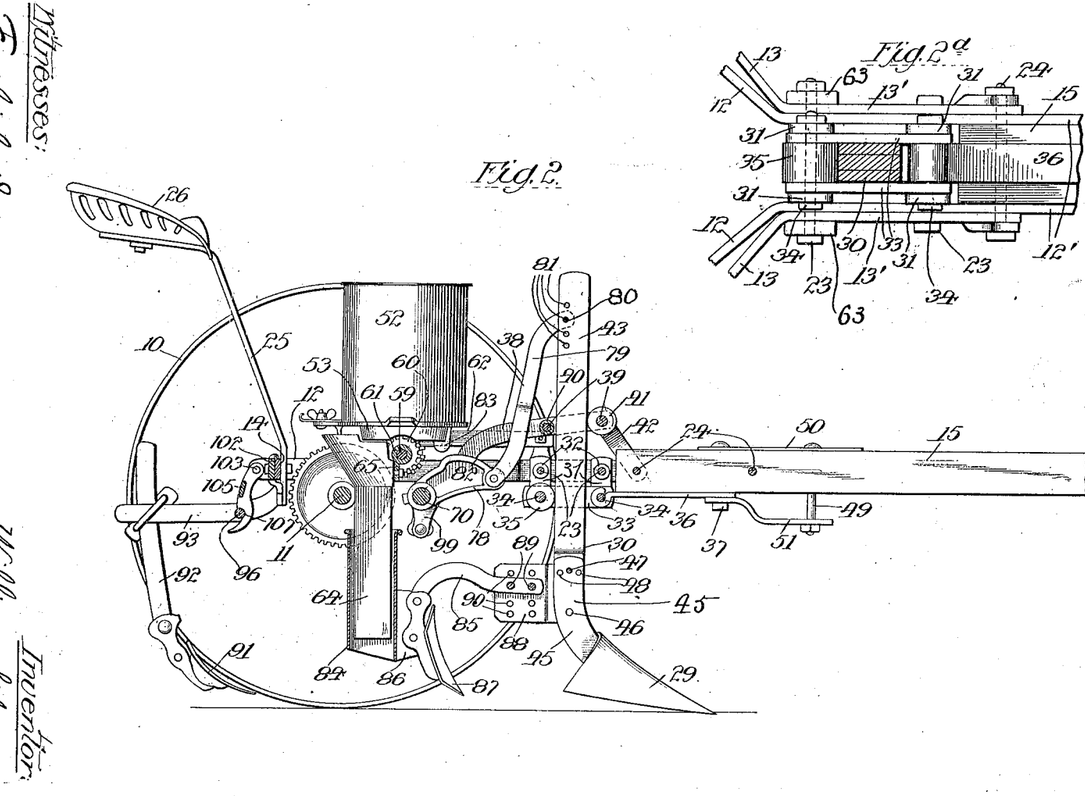
Fig. 2 is a longitudinal section on line 2 2 of Fig. 3.

The lower end of the seed-delivery chute 64 is provided with an outer vertically-shiftable telescopic section 84. A curved bar 85 is rigidly bolted, as shown in Figs. 1 and 2, to a bracket 86 on the front side of the telescopic chute-section 84 and carries on its lower end a small furrow-opener 87 directly in front of the lower end of the seed-chute. The forward end of the bar 85 extends between a pair of plates 88, secured on opposite sides of the standard 30 and foot 45 by the bolts 46 and 47. A pair of bolts 89 extend through the plates 88 and the forward end of the bar 85 and rigidly secure said bar and the parts connected thereto to the plow-standard. Two rows of holes 90 formed in the plates are arranged to receive the bolts 89, so that the shifting chute-section 84 and furrow-opener 87 may be adjusted relatively to the plow 29 and plow 30. By this construction a single arm upon the common shifter rock-shaft 70 serves to raise and lower plow 29, chute-section 84, and furrow-opener 87 and to throw the seed mechanism into and out of gear as the plow and furrow-opener are moved to and from working position. Moreover, the cam 82 is so arranged as to quickly shift the seed mechanism out of gear as soon as the plow and furrow-opener are started from the ground by the operator through the medium of the hand-lever 73 and shift mechanism controlled thereby.

A pair of shoes or other suitable covering devices 91 are arranged in rear of the feed-delivery chute, and the shanks 92 of the covering tools or blades are secured to the rear ends of a pair of drag-bars 93 by means of straps and U-bolts, as shown. The forward ends of the drag-bars 93 are arranged between the inner side bars 12 and the parallel portions 13$^b$ of the outer side bars. Pivot-bolts 94 extend through the adjacent parallel portions of the inner and outer side bars and the forward ends of the drag-bars. The drag-bars extend rearwardly from the pivot-bolts 94 over the bearing-boxes 16 and between guide-fingers 95 thereon and the inner side bars. (See Figs. 3 and 4.) A cross-bolt 96 at the rear of the frame rigidly connects the drag-bars.

The drag-bars are shifted to and from vertical position by the operation of the common shifter rock-shaft 70, and for this purpose a pair of cams 97 (see Figs. 3$^a$ and 4$^a$) are mounted upon the shaft. These cams are preferably rotatably adjustable upon the shifter rock-shaft 70 to vary the throw of the drag-bars. Arms 98 are rigidly secured to the shaft adjacent the cams 97, and the cams are provided with corresponding adjacent arms 99. An adjustable bolt-and-slot connection between the lower ends of the arms comprises a bolt 100, engaging a slot 101 in the arm 98. By means of this bolt-and-slot connection the shifter-cams 97 of the drag-bars may be adjusted and held in adjusted position. Suitable means are provided for automatically engaging and holding these drag-bars and the covering devices carried thereby in working position. For this purpose a bracket 102 is secured to the rear bar 14 of the frame, and on a pivot-bolt 103, extending between ears 104 upon the bracket, is mounted a lock 105. The lock comprises a pair of arms 106, terminating in curved catches or stops 107 and connected by a cross-piece 108. A spring 109 is coiled about the pivot-bolt 103, and its ends engage, respectively, with the bracket 102 and with the cross-bar 108 of the lock. The lock is held in such position by the spring that the cross-bar 96 between the drag-bars 93 will be automatically engaged by the catches or stop devices 107 on the lock as the drag-bars and ground-tools are lowered to working position. The drag-bars 93 are preferably provided with foot-pieces 110, by which the rider may assist in forcing the bars and the covering devices carried thereby to working position and into engagement with the locking means.

The controlling shift mechanism is arranged to automatically release the lock when operated to lift the drag-bars from working position, and for this purpose a suitable connection extends between the lock and the arm 98 upon the shifter rock-shaft 70. This connection comprises, as shown, a rod 111, pivoted at its rear end to one side of the lock 105, and a chain 112, connecting the forward end of the rod with the arm 98 on the rock-shaft. (See Fig. 1.) As soon as the hand-lever and rock-shaft are moved to lift the drag-bars from working position the lock 105 is shifted against the tension of its spring 109 by the connecting chain and rod to release the drag-bars and permit them to be shifted from working position.

At times it may be desired to hold the locking means out of operation, and for this purpose a shouldered latch 113 is pivoted upon an upstanding lug 114 on the bracket 102 and is arranged to engage the shoulder 115 to hold the lock out of operation, as shown in Fig. 5$^c$. A trip-finger 116 upon the latch is arranged to shift the latter and permit the return of the locking device to operative position.

It will be observed that all operating parts of the planter are controlled by a common shifter and single actuating hand-lever, so that the rider may easily control the machine and at the same time guide his team. The lift-cams 97 for the drag-bars are arranged, as shown in Fig. 3$^a$, closely adjacent the pivot-bolts 94 of the drag-bars, so that a very short throw of the shift mechanism is necessary to lift the drag-bars. Correspondingly the shift-arm 78 for the plow and cam 82 for disengaging the drive-gear for the seed mechanism are also arranged to throw these parts out of working position upon a short throw of the operating-handle.

It will be observed that the adjustable connections between the crank-arm 78 and the standard 30 are entirely independent of the other shiftable parts controlled by the rocker-shaft, so that the adjustment of the plow or other suitable furrow-opening device carried by the standard may be effected without disturbing the relative relation and operation of the other parts of the machine.

If desired, the drag-bars 93 may be disconnected by removing the connecting cross-bolt 96, so that the covering devices carried by the drag-bars may move independently.

When the drag-bars are so disconnected, the guide-fingers 95 upon the bearing-boxes 16 prevent side play of the drag-bars and of the covering devices carried thereby.

It is obvious that numerous changes may be made in the details of construction without departure from the features of the invention.

Having described my invention, what I claim as new, and desire to secure by Letters-Patent, is—

1. In planters, the combination of the wheel-axle, frame and draft-tongue, said frame comprising inner and outer side bars spaced apart at their rear ends, and having forward converging ends secured to said tongue and bearing-boxes for said wheel-axle extending between and secured to the separated rear ends of said inner and outer side bars.

2. In planters, the combination of the wheel-axle, frame and draft-tongue, said frame comprising inner and outer side bars spaced apart at their rear ends, and having forward converging ends secured to said tongue, bearing-boxes for said wheel-axle, and shouldered lugs on opposite ends of said bearing-boxes engaging and secured respectively to rear separated ends of said inner and outer side bars.

3. In planters, the combination of the wheel-axle, frame and draft-tongue, said frame comprising an inner loop having parallel side bars converging at their front ends and terminating in forwardly-extended parallel portions overlapping the sides of said tongue, bearing-boxes for said axle secured at their inner ends to the rear ends of said side bars, outer bracing side bars secured at their rear ends to the outer ends of said bearing-boxes, said outer side bars converging at their forward ends and terminating in forwardly-extending parallel portions overlapping the forward ends of said inner side bars, and bolts extending through the forward ends of said inner and outer side bars and said tongue.

4. In planters, the combination of the wheel-axle, frame and tongue, said frame comprising inner and outer side bars spaced apart at their rear ends having parallel portions at the front part of the frame and converging forward ends secured to said tongue, pivot-bolts extending through the parallel portions of said inner and outer side bars, rearwardly-extending drag-bars having their forward ends extending between the parallel portions of said inner and outer side bars and pivoted on said bolts, bearing-boxes for said wheel-axle secured to the rear ends of said inner and outer side bars, seats on said boxes for said drag-bars and covering devices carried by said bars.

5. In planters, the combination with a frame and seed mechanism thereon, of a vertical standard in front of said seed mechanism, a guide-pocket on said frame through which said standard shifts, said standard having its lower end portion reduced in width, a foot comprising side pieces embracing and adjustably connected to the lower reduced end of said standard, the outer sides of said standard and foot being on the same vertical planes, and a furrow-forming device connected to said foot.

6. In planters, the combination with a frame, seedbox and delivery-chute, of a vertically-shiftable section and furrow-opener at the lower end of said chute, a plow and standard in front of said chute, means for vertically shifting said plow and standard and adjustable means connecting said standard with said lower chute-section and furrow-opener for common shift, said means comprising a pair of plates secured to opposite sides of said standard, a bar connected to said chute-section and furrow-opener and extending between said plates and adjustable bolt connections between said bar and plates.

7. In planters, the combination with the frame and seed mechanism thereon, of a furrow-forming device, an upright standard therefor vertically shiftable in front of said seed mechanism, a guide on the frame for said standard, braces connected at the rear end to said frame and extending upwardly and forwardly therefrom to embrace said standard above said guide and a roller held between the front end of said braces and engaging the forward edge of said standard, substantially as described.

8. In planters, the combination with the frame and seed mechanism thereon, said frame having side bars arranged adjacent each other at their forward ends, of a furrow-forming device in front of said seed mechanism, an upright standard therefor vertically shiftable between the forward adjacent ends of said side bars, a guide-roller on the frame engaging the rear face of said standard, a pair of brace-bars secured to said side bars at their rear ends and extending upwardly and forwardly on opposite sides of said standard and a roller above said first-mentioned roller journaled between the forward ends of said brace-bars and engaging the front end of said standard, substantially as described.

9. In planters, the combination with the frame and seed mechanism thereon, of a furrow-forming device and standard therefor vertically shiftable in front of said seed mechanism, lugs on the forward ends of the side bars of said frame connecting straps between said lugs forming a pocket to receive said standard, and a roller supported between said straps and engaging the rear face of said standard.

10. In planters, the combination with the frame and seed mechanism thereon, of a furrow-forming device and a vertical standard therefor shiftable in front of said seed mechanism, guides for said standard arranged out of line, one above the other and engaging the front and rear faces respectively of the standard and tension-straps extending rearwardly from the upper front guide to the frame and forwardly from the lower rear guide to the frame for taking the thrust on said guides, substantially as described.

11. In planters, the combination with the frame and seed mechanism thereon, of a furrow-forming device and a vertical standard therefor shiftable in front of said seed mechanism, guide-rollers arranged out of line one above the other and engaging the front and rear faces respectively of said standard and tension-braces for taking the thrust on said rollers extending rearwardly from the upper front roller to the frame and forwardly from the lower rear roller to the frame.

12. In planters, the combination with the frame and seed mechanism, of a cross rock-shaft, a pair of drag-bars pivoted to said frame and extending over said shaft and cams on said shaft arranged to engage and elevate said drag-bars.

13. In planters, the combination with the frame and seed mechanism thereon, of a cross rock-shaft on the frame, an operating shift-lever therefor, drag-bars pivoted to said frame and extending rearwardly over said shaft, covering devices carried by said drag-bars and cams adjustably mounted on said rock-shaft for engaging and elevating said drag-bars.

14. In planters, the combination with the frame and seed mechanism thereon, of rearwardly-extending drag-bars connected to the frame, covering devices carried by said drag-bars, a rock-shaft on the frame, cams on said shaft engaging and shifting said drag-bars, said cams being rotatable adjustably on said shaft, arms fixed on said shaft adjacent said cams and adjustable bolt-and-slot connections between said arms and cams.

15. In planters, the combination with the frame and seed mechanism thereon, of drag-bars pivoted to said frame, covering means carried by said bars, shift mechanism for raising said drag-bars, stop devices on the frame for holding said drag-bars in working position and means operated by said shift mechanism for releasing said stop devices, substantially as described.

16. In planters, the combination with the frame and seed mechanism thereon, of covering devices connected to said frame, a shifter rock-shaft having means for raising said covering devices, a lock for holding the same in working position, and a connection between said rock-shaft and lock whereby the latter is released when said rock-shaft is shifted to lift said covering devices.

17. In planters, the combination with the frame and seed mechanism thereon, of rearwardly-extending drag-bars pivoted to said frame, covering devices carried by said bars, a cross rock-shaft extending beneath said bars, cams on said shaft for lifting said bars, a lock on the frame for holding said bars in working position and means operated by said rock-shaft for releasing said lock.

18. In planters, the combination with the frame and seed mechanism thereon, of covering devices connected to the frame, a lock arranged to automatically engage and hold said covering devices in working position and a latch for holding said lock out of operation.

19. In planters, the combination with the frame and seed mechanism thereon, of drag-bars connected to the frame, covering means carried by said bars, a spring-held stop device for automatically holding said bars in working position and means for holding said stop device out of operation.

20. In planters, the combination with the frame and seed mechanism thereon, of drag-bars pivoted to the frame, covering devices carried thereby, a cross-bar connecting said drag-bars, a spring-actuated lock pivoted on the frame arranged to automatically engage said cross-bar and hold said drag-bars in working position and a pivoted latch for holding said lock out of operation.

21. In planters, the combination with a frame and seeding mechanism thereon, of drag-bars hung on the frame, covering devices carried thereby, stop device arranged to automatically engage and hold said bars in working position and means for releasing said stop device.

22. In planters, the combination with the frame and seeding mechanism thereon, of drag-bars hung on the frame, covering devices carried thereby, a spring-held stop device arranged to automatically engage and hold said bars in working position, means for releasing said stop device and means for holding the same out of operation.

23. In planters, the combination with the frame and seeding mechanism thereon, of drag-bars hung on the frame, ground-tools carried thereby, means arranged to automatically engage and hold said bars in working position, a shifter arranged to raise said bars from working position, means actuated by said shifter for releasing said locking means and means for holding said locking means out of operation.

24. In planters, the combination with the frame and seed mechanism thereon, of drag-bars pivoted on the frame, covering devices carried thereby, a spring-held lock arranged to automatically engage and hold said bars in working position, a shifter for lifting said bars from working position, connections between said shifter and lock for releasing the latter and a latch for holding said lock out of operation.

25. In planters, the combination with the frame and drive-axle, of a seedbox mounted on said frame, a rotatable seed-plate and an actuating beveled gear in the bottom of said seedbox, a spur-gear on said wheel-shaft, a counter-shaft and a combined pinion having beveled and spur portions formed integral with each other mounted on said counter-shaft and meshing with said spur-gear on the wheel-shaft and with the bevel-gear in the seedbox-bottom.

26. In planters, the combination with the frame and seed mechanism thereon, of a plow mounted on said frame in front of said seed mechanism, rearwardly-extending drag-bars carried on the frame independently of said plow, covering devices carried by said bars, a shifter rock-shaft journaled on the frame below said drag-bars, an operating hand-lever for said rock-shaft, connections between said rock-shaft and said plow for raising the latter and cam-arm on said rock-shaft for engaging and raising said drag-bars, substantially as described.

27. In planters, the combination with the frame, seedbox and delivery-chute thereon, of a furrow-forming device mounted on said frame in front of said chute, rearwardly-extending drag-bars pivoted to said frame, covering devices carried by said bars, a rock-shaft on the frame, a crank on the rock-shaft, a link connecting said crank and furrow-forming device for shifting the latter, and cams on said shaft for raising said drag-bars.

28. In planters, the combination with the frame, drive-axle and seed mechanism, of gearing between said drive-axle and seed mechanism, a shiftable furrow-forming device and rearwardly-extending drag-bars independently mounted on said frame, covering devices carried by said drag-bars, a rock-shaft on the frame below said drag-bars, an operating hand-lever therefor, means on said rock-shaft for raising said furrow-forming device and for disconnecting said gearing and cam-arms on said rock-shaft for engaging and raising said drag-bars, substantially as described.

29. In planters, the combination with the frame and drive-axle, of a seedbox mounted on said frame, seed mechanism in the box-bottom, gearing between said drive-axle and said seed mechanism, said seedbox being shiftable to disconnect said gearing, a vertically-shiftable furrow-forming device in front of said seed mechanism, rearwardly-extending drag-bars pivoted to the frame, covering devices carried by said bars, a rock-shaft journaled on the frame below said drag-bars and seedbox connected to raise and lower said furrow-forming device and arms on said rock-shaft for engaging and raising said seedbox, and said drag-bars, substantially as described.

30. In planters, the combination with the frame and drive-axle, of a seedbox mounted on said frame, seed mechanism in the box-bottom gearing between said drive-axle and said seed mechanism, said seedbox being shiftable to disconnect said gearing, a vertically-shiftable furrow-forming device in front of said seed mechanism, rearwardly-extending drag-bars pivoted to the frame, covering devices carried by said bars, a cross rock-shaft, cams on said shaft for raising said drag-bars and seedbox and a crank-and-link connection between said shaft and said furrow-forming device for raising the latter.

31. In planters, the combination with the frame and drive-axle, of a seedbox mounted on said frame, seed mechanism in the box-bottom, gearing between said drive-axle and said seed mechanism, said seedbox being shiftable to disconnect said gearing, a furrow-forming device shiftably mounted on the frame in front of said seed mechanism, a cross rock-shaft, an arm on said shaft, connection between said arm and furrow-forming device for raising the latter and a cam on said arm for raising said seed-can.

32. In planters, the combination with the frame, drive-axle and seed mechanism, of gearing between said drive-axle and seed mechanism, a furrow forming device shiftably mounted on the frame in front of said seed mechanism, a cross rock-shaft, an arm on said shaft, connections between said arm and furrow-forming device for raising the latter and means on said arm for disconnecting said gearing.

33. In planters, the combination with the frame and seed mechanism thereon, of a furrow-forming device vertically shiftable in front of said seed mechanism, rearwardly-extending drag-bars pivoted to the frame, covering devices carried thereby, a shifter rock-shaft below said drag-bars, means on said rock-shaft for engaging and raising said drag-bars and independent adjustable connections between said shaft and furrow-forming device for raising the latter.

34. In planters, the combination with the frame and drive-axle, seed mechanism on said frame, gearing between said axle and said seed mechanism, said seed mechanism being vertically movable into and out of gear, a shiftable furrow-forming device in front of said seed mechanism, rearwardly-extending drag-bars pivoted to said frame and covering devices, a rock-shaft journaled on the frame below said drag-bars and seed mechanism, arms on said shaft for engaging and raising said drag-bars and said seed mechanism and an adjustable connection between said shaft and said furrow-forming device for raising the latter, substantially as described.

35. In planters, the combination with the frame and drive-axle, of seed mechanism on said frame, gearing between said axle and seed mechanism, said seed mechanism being shiftable to connect and disconnect said gearing, a shiftable furrow-forming device in front of said seed mechanism, rearwardly-extending drag-bars pivoted to the frame, covering devices carried by said drag-bars, a shifter rock-shaft on the frame beneath said drag-bars and seed mechanism, cams on said shaft for raising said drag-bars, an arm fixed to said shaft, a cam on said arm for lifting said seed mechanism out of gear and an adjustable link connection between said arm and furrow-forming device.

36. In planters, the combination of the wheel and wheel-axle frame and draft-tongue, said frame comprising side bars connected at their forward ends to said tongue, bearing-boxes for said wheel-axle secured to said side bars, rearwardly-extending drag-bars pivoted at their forward ends to said side bars and extending over said bearing-boxes, covering devices carried by said drag-bars and lugs on said bearing-boxes for limiting the lateral movement of said drag-bars.

WILLIAM SOBEY.

Witnesses:
LAWRENCE JOHNSON,
CHARLES ARMSTRONG.